(12) United States Patent
Park et al.

(10) Patent No.: US 11,296,767 B2
(45) Date of Patent: Apr. 5, 2022

(54) METHOD FOR REPORTING CHANNEL STATE INFORMATION IN WIRELESS COMMUNICATION SYSTEM, AND DEVICE THEREFOR

(71) Applicant: LG ELECTRONICS INC., Seoul (KR)

(72) Inventors: Haewook Park, Seoul (KR); Jiwon Kang, Seoul (KR); Hyungtae Kim, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/050,426

(22) PCT Filed: May 7, 2019

(86) PCT No.: PCT/KR2019/005434
§ 371 (c)(1),
(2) Date: Oct. 23, 2020

(87) PCT Pub. No.: WO2019/212323
PCT Pub. Date: Nov. 7, 2019

(65) Prior Publication Data
US 2021/0058126 A1   Feb. 25, 2021

(30) Foreign Application Priority Data
May 4, 2018   (KR) .................. 10-2018-0051580

(51) Int. Cl.
*H04B 7/06*   (2006.01)
*H04L 5/00*   (2006.01)

(52) U.S. Cl.
CPC ......... *H04B 7/0626* (2013.01); *H04L 5/0023* (2013.01); *H04L 5/0057* (2013.01); *H04L 5/0094* (2013.01)

(58) Field of Classification Search
CPC ... H04B 7/0626; H04L 5/0023; H04L 5/0057; H04L 5/0094
See application file for complete search history.

(56) References Cited

U.S. PATENT DOCUMENTS 8,639,198 B2 *   1/2014   Liu .................. H04B 7/0639
455/115.1
2013/0114554 A1   5/2013   Yang et al.
(Continued)

FOREIGN PATENT DOCUMENTS

KR   20130028783   3/2013
WO   2014/088307   6/2014
(Continued)

OTHER PUBLICATIONS

PCT International Application No. PCT/KR2019/005434, International Search Report dated Sep. 4, 2019, 3 pages.
(Continued)

*Primary Examiner* — Sophia Vlahos
(74) *Attorney, Agent, or Firm* — Lee Hong Degerman Kang & Waimey

(57) ABSTRACT

A method for reporting channel state information (CSI) in a wireless communication system is disclosed. More specifically, the method performed by a user equipment (UE) includes receiving, from a base station, configuration information related to the channel state information, wherein the configuration information includes a number of a plurality of subbands allocated to the UE; measuring parameter values related to a channel state of one or more subbands of the plurality of subbands based on the configuration information; and reporting, to the base station, channel state infor-
(Continued)

mation of the one or more subbands including the measured parameter values, wherein a number of the one or more subbands is determined based on a value of a rank indicator (RI).

13 Claims, 11 Drawing Sheets

(56) References Cited

U.S. PATENT DOCUMENTS

| | | | | |
|---|---|---|---|---|
| 2014/0226611 A1* | 8/2014 | Kang | ............... | H04B 7/0639 370/329 |
| 2018/0175993 A1* | 6/2018 | Onggosanusi | ....... | H04B 7/0486 |
| 2019/0036585 A1* | 1/2019 | Hosseini | ............. | H04W 72/042 |
| 2020/0052868 A1* | 2/2020 | Zhang | ............... | H04L 5/0091 |

FOREIGN PATENT DOCUMENTS

| | | | | |
|---|---|---|---|---|
| WO | WO-2018141272 A1 * | 8/2018 | ............ | H04W 72/12 |
| WO | WO-2018231812 A1 * | 12/2018 | ............ | H04W 76/27 |

OTHER PUBLICATIONS

Huawei et al, "Remaining issues on CSI reporting," 3GPP TSG RAN WG1 Meeting #92, R1-1801452, Athens, Greece, Feb. 26-Mar. 2, 2018, 11 pages.
3GPP TS 38.214 V15.1.0 (Mar. 2018); TS; 3GPP; TSGRAN; NR; Physical layer procedures for data (Release 15); 77 pages.

* cited by examiner

【FIG. 1】
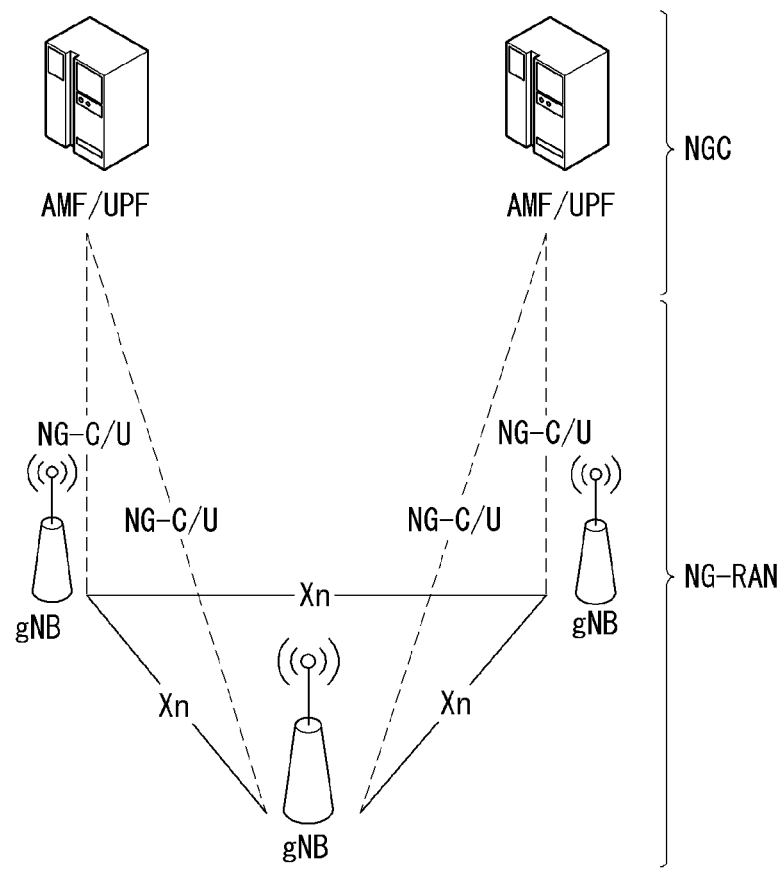
【FIG. 2】
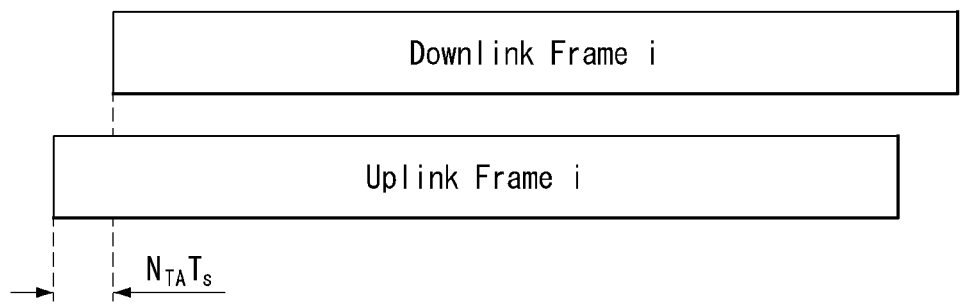

[FIG. 3]
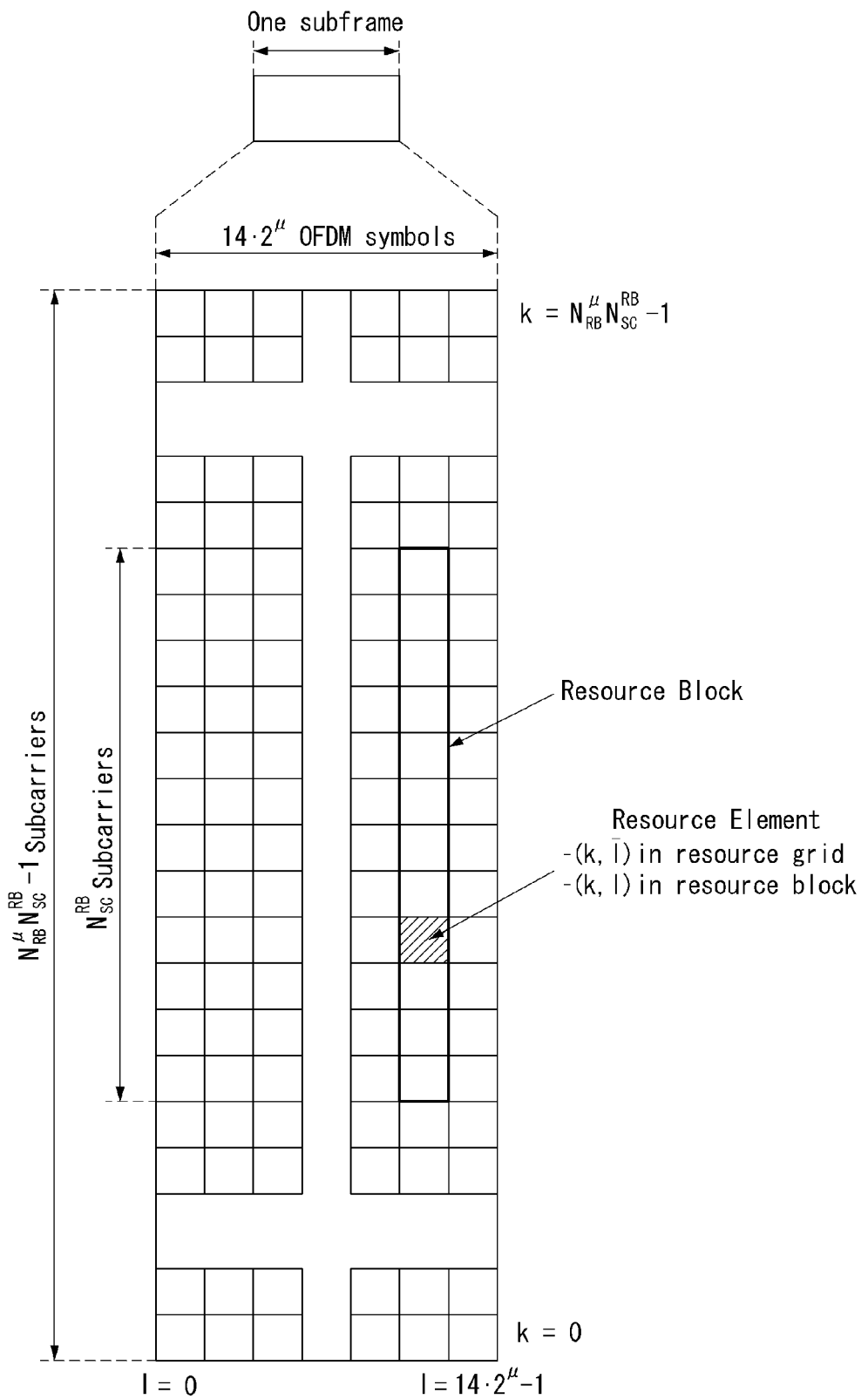

[FIG. 4]
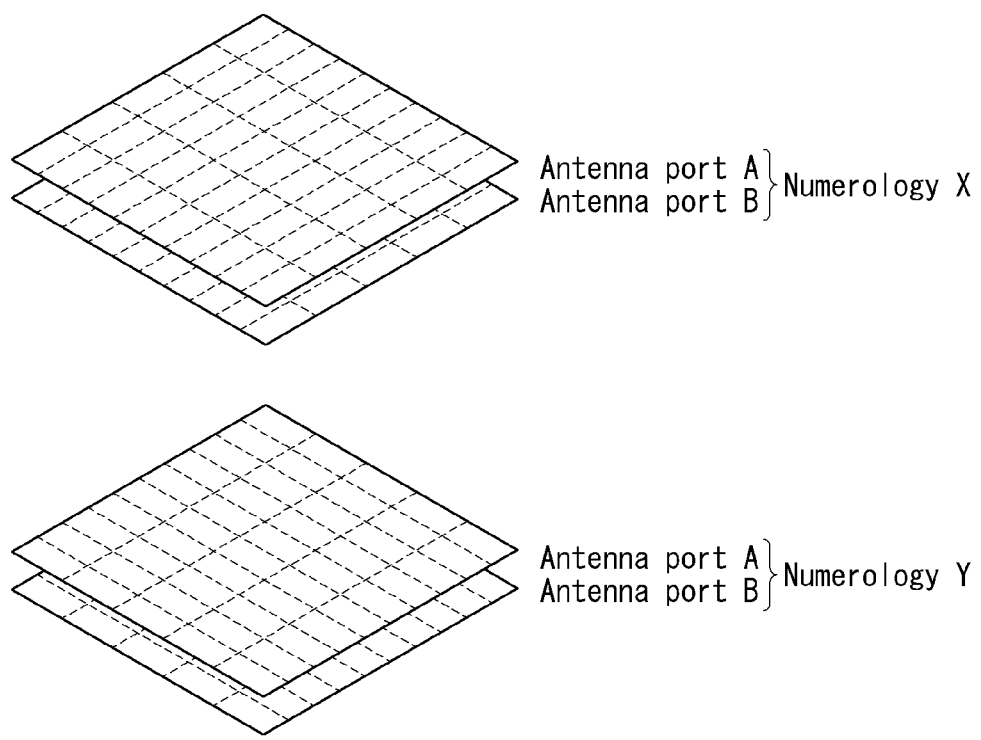

[FIG. 5]
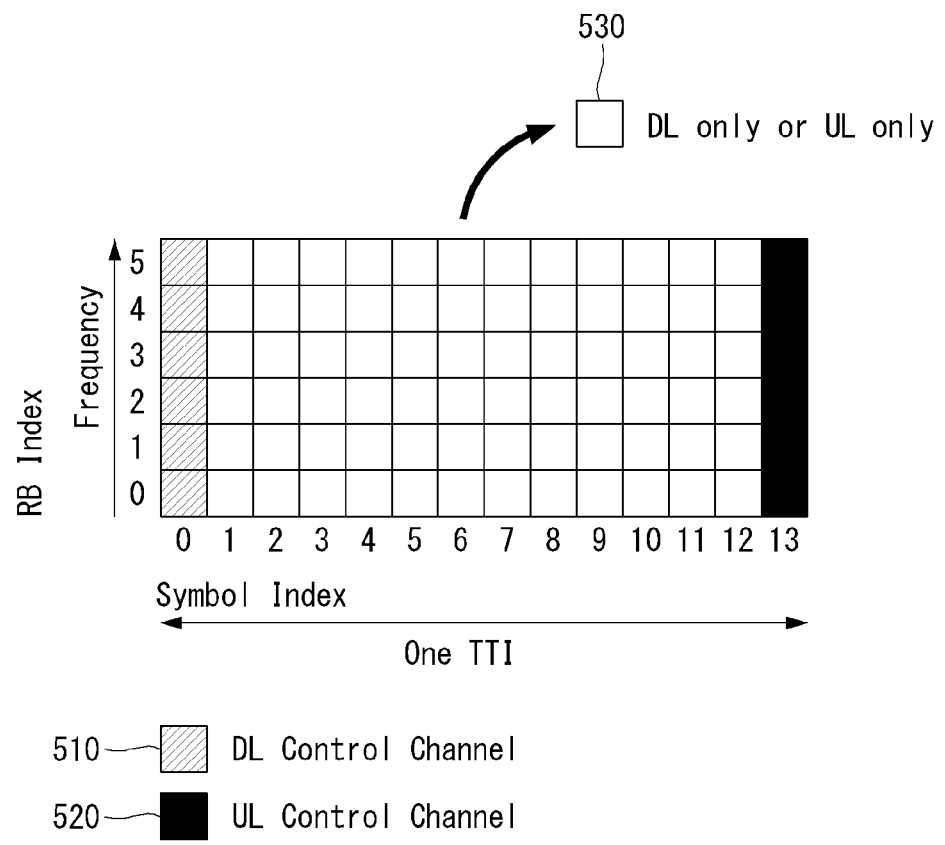

[FIG. 6]
(a)
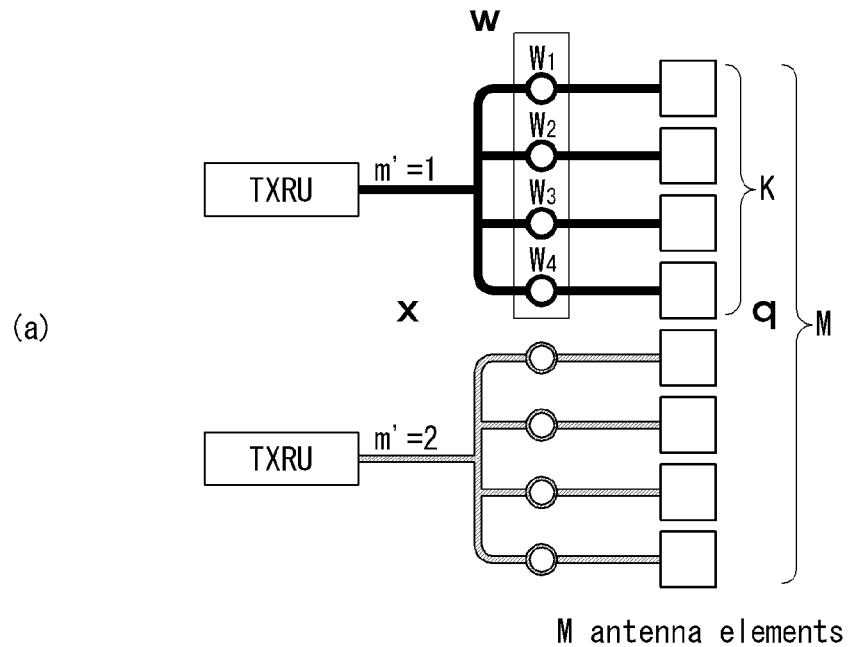
(b)
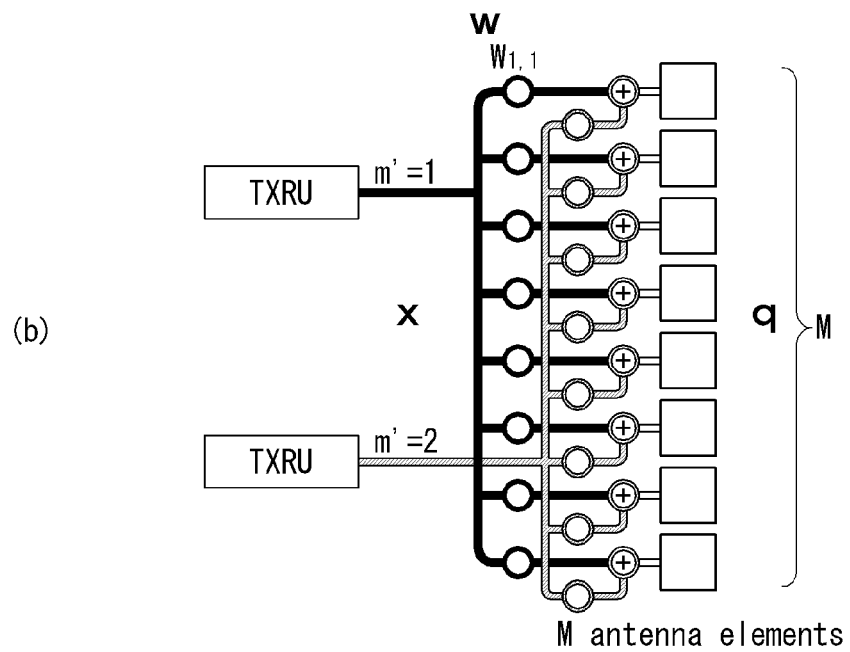

[FIG. 7]
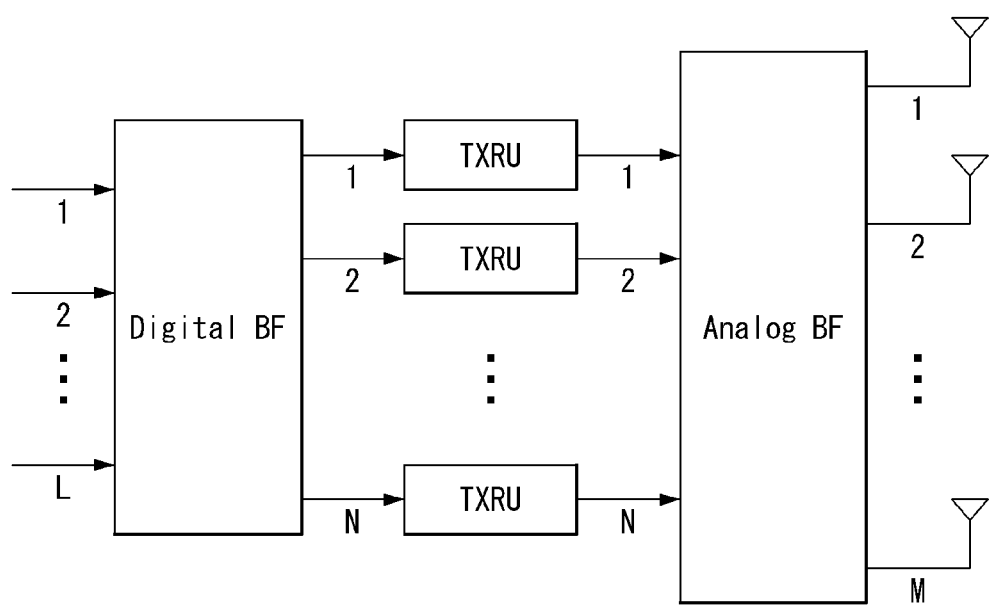

[FIG. 8]
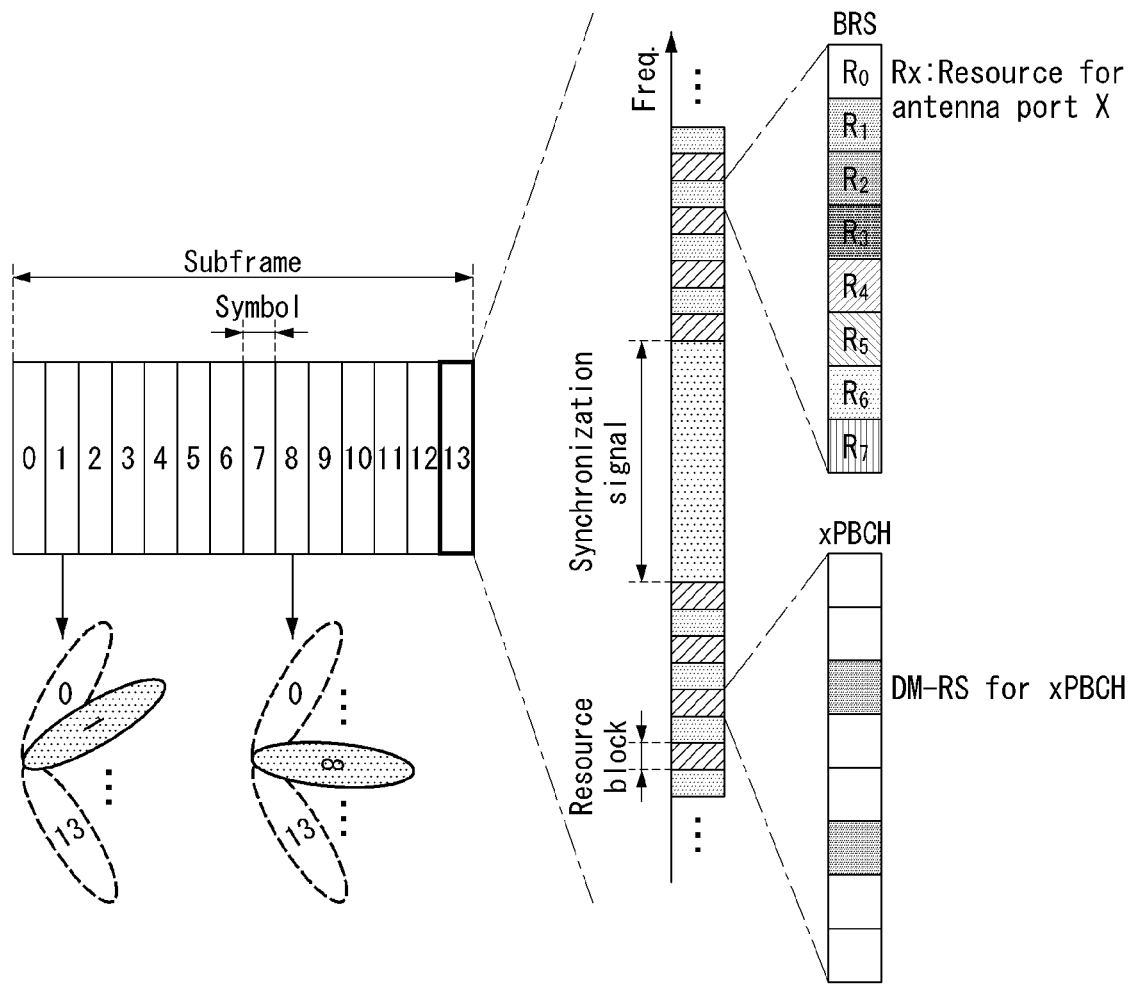

【FIG. 9】
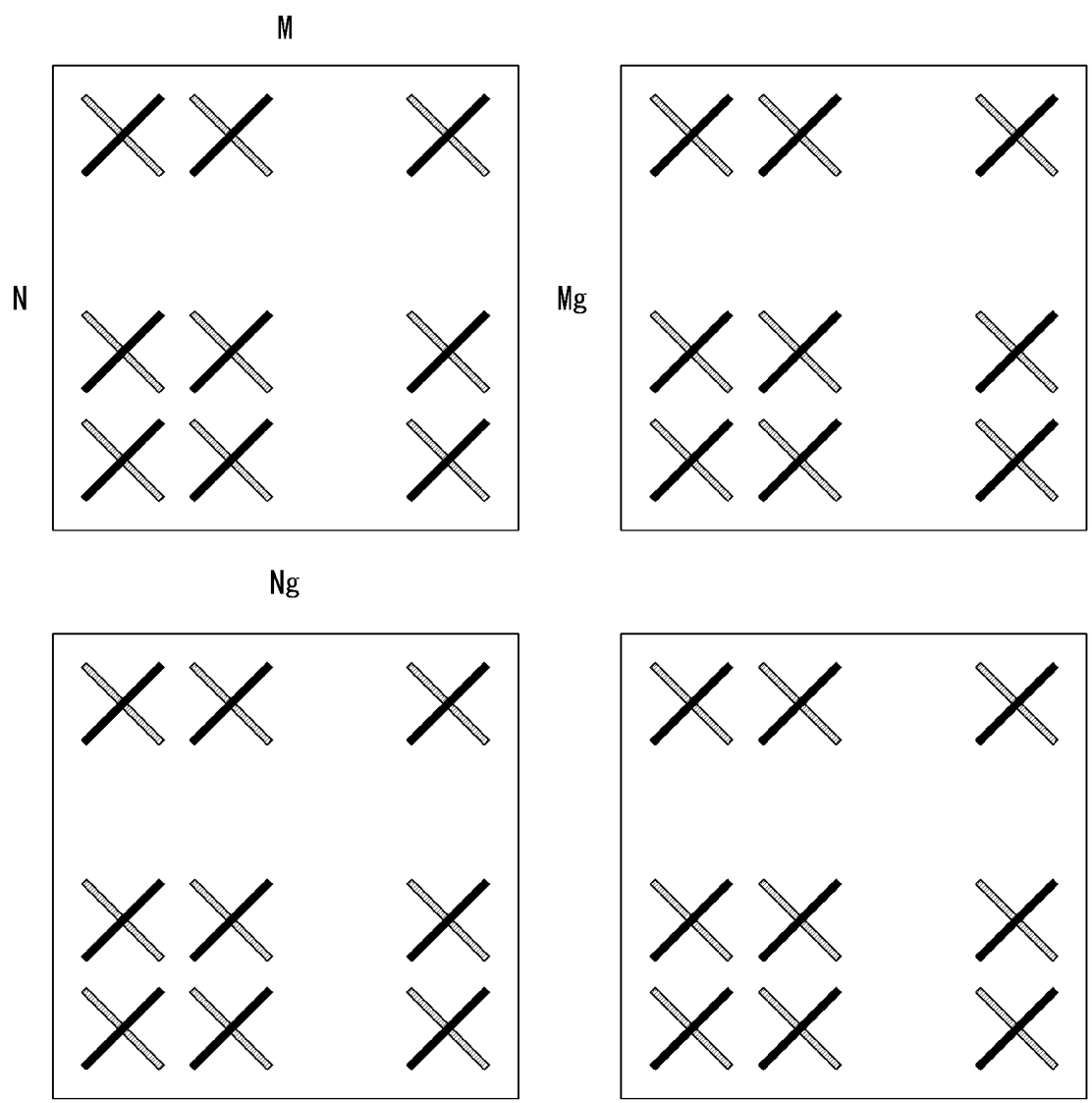

[FIG. 10]
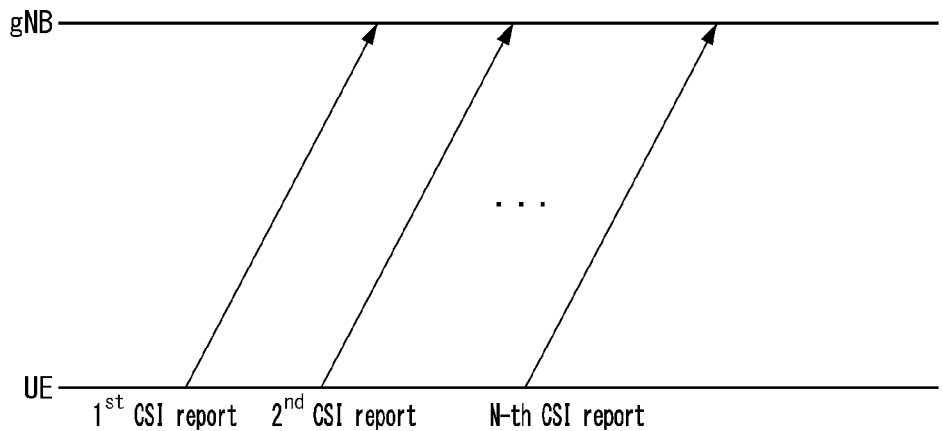
[FIG. 11]
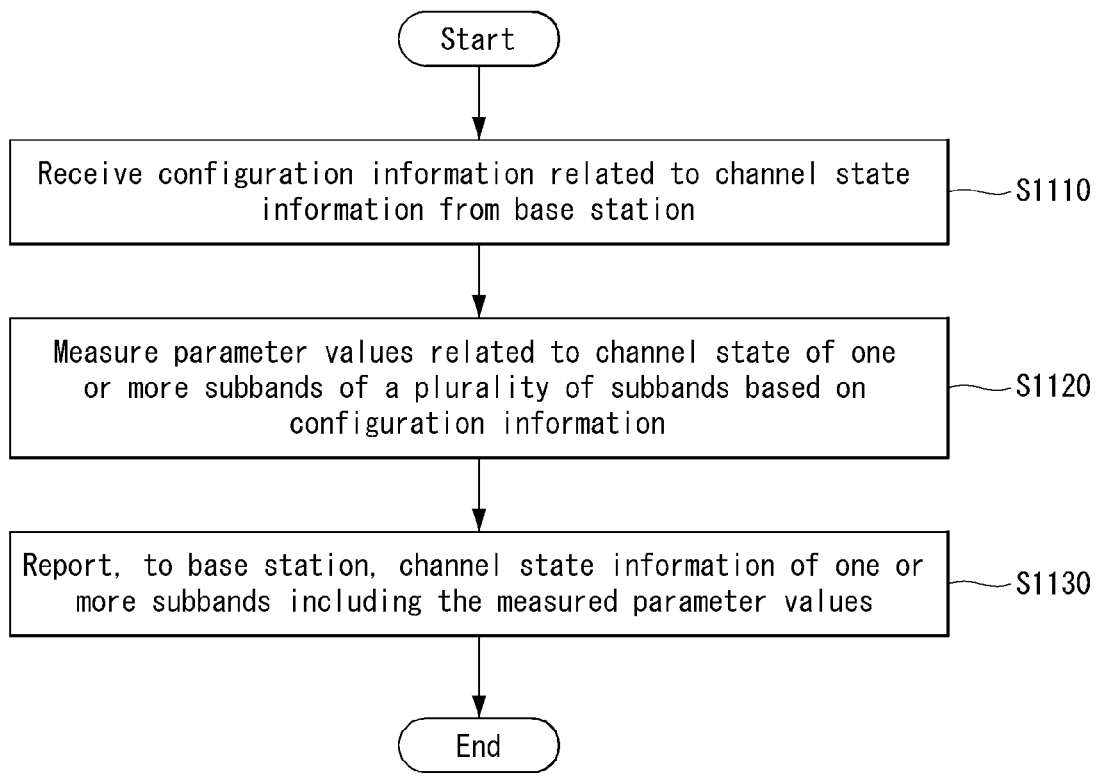

[FIG. 12]
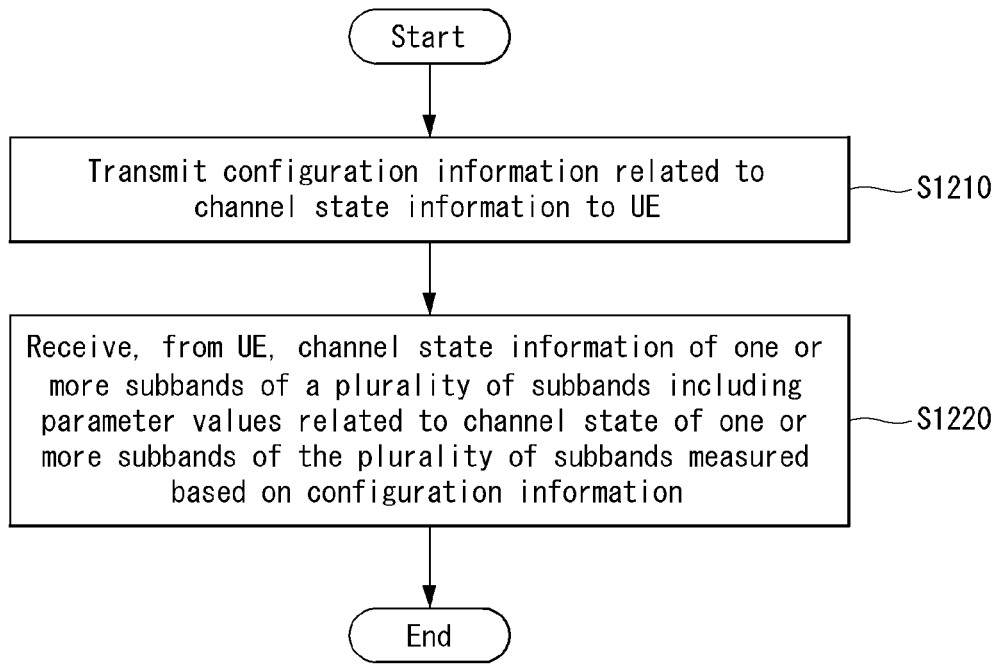
[FIG. 13]
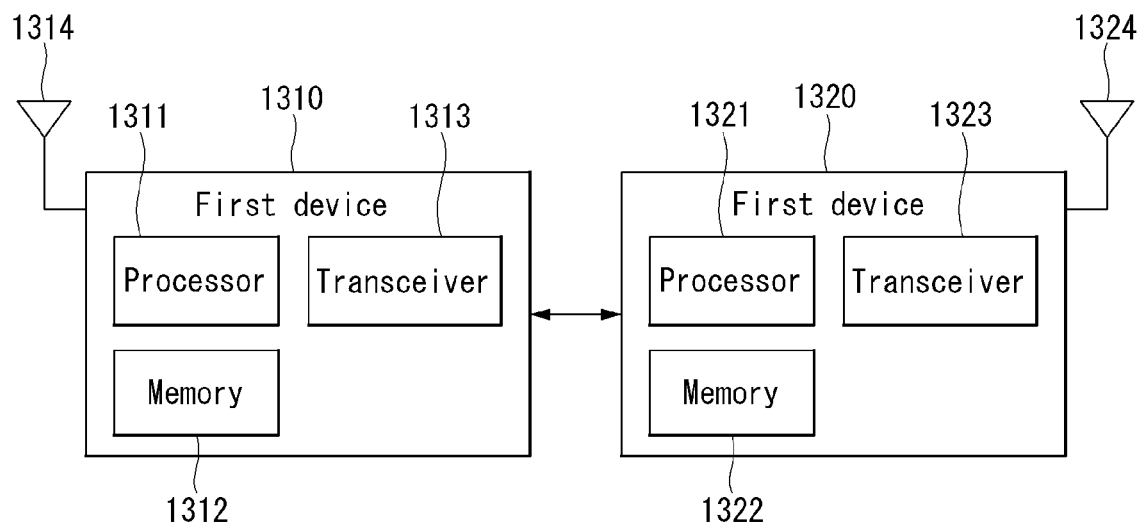

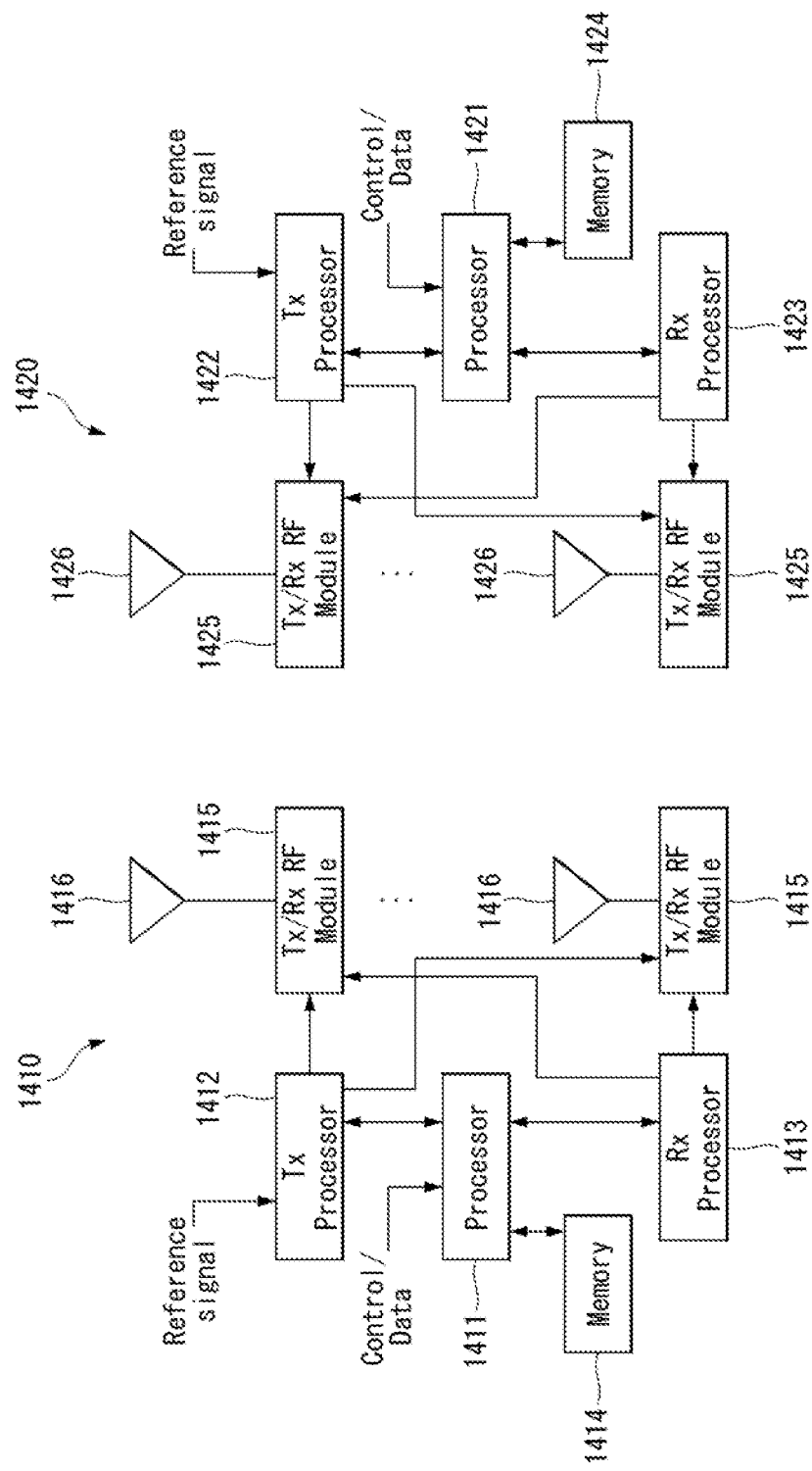
[FIG. 14]

ent (UE) comprises receiving, from a base station, configuration information related to the channel state information, wherein the configuration information includes a number of a plurality of subbands allocated to the UE; measuring parameter values related to a channel state of one or more subbands of the plurality of subbands based on the configuration information; and reporting, to the base station, channel state information of the one or more subbands including the measured parameter values, wherein a number of the one or more subbands is determined based on a value of a rank indicator (RI).

METHOD FOR REPORTING CHANNEL STATE INFORMATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2019/005434, filed on May 7, 2019, which claims the benefit of earlier filing date and right of priority to Korean Application No. 10-2018-0051580, filed on May 4, 2018, the contents of which are all hereby incorporated by reference herein in their entirety.

TECHNICAL FIELD

The present disclosure relates to a wireless communication system, and more particularly to a method for reporting channel state information and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present disclosure is to provide a method for reporting channel state information (CSI).

Another object of the present disclosure is to provide a method for distributing and reporting CSI on a time domain.

Another object of the present disclosure is to provide a method for distributing and reporting CSI on a frequency domain.

The technical problems of the present disclosure are not limited to the aforementioned technical problems, and other technical problems which are not mentioned above will be apparently appreciated by a person having ordinary skill in the art from the following description.

Technical Solution

The present disclosure provides a method for reporting channel state information (CSI) in a wireless communication system.

More specifically, the method performed by a user equipment (UE) comprises receiving, from a base station, configuration information related to the channel state information, wherein the configuration information includes a number of a plurality of subbands allocated to the UE; measuring parameter values related to a channel state of one or more subbands of the plurality of subbands based on the configuration information; and reporting, to the base station, channel state information of the one or more subbands including the measured parameter values, wherein a number of the one or more subbands is determined based on a value of a rank indicator (RI).

The number of the one or more subbands is determined by dividing the number of the plurality of subbands by the RI value.

Reporting the channel state information of the one or more subbands is performed at a specific subband interval based on the number of the one or more subbands.

Each of the one or more subbands is comprised of a combination of two or more subbands of the plurality of subbands based on the RI value.

The configuration information includes information for sizes of the plurality of subbands. When the RI value is equal to or greater than a specific criterion, the sizes of the plurality of subbands are determined by a pre-configured value regardless of the configuration information.

The configuration information includes a plurality of candidate values for sizes of the plurality of subbands. When the RI value is equal to or greater than a specific criterion, the sizes of the plurality of subbands are determined by a largest value of the plurality of candidate values.

Other subbands, except the one or more subbands for measuring the parameter values related to the channel state, among the plurality of subbands are dropped.

In another aspect, there is provided a user equipment (UE) reporting channel state information (CSI) in a wireless communication system, the UE comprising a radio frequency (RF) module configured to transmit and receive a radio signal; and a processor functionally connected to the RF module, wherein the processor is configured to receive, from a base station, configuration information related to the channel state information, wherein the configuration information includes a number of a plurality of subbands allocated to the UE; measure parameter values related to a channel state of one or more subbands of the plurality of subbands based on the configuration information; and report, to the base station, channel state information of the one or more subbands including the measured parameter values, wherein a number of the one or more subbands is determined based on a value of a rank indicator (RI).

The number of the one or more subbands is determined by dividing the number of the plurality of subbands by the RI value.

The reporting of the channel state information of the one or more subbands is performed at a specific subband interval based on the number of the one or more subbands.

Each of the one or more subbands is comprised of a combination of two or more subbands of the plurality of subbands based on the RI value.

The configuration information includes information for sizes of the plurality of subbands. When the RI value is equal to or greater than a specific criterion, the sizes of the plurality of subbands are determined by a pre-configured value regardless of the configuration information.

The configuration information includes a plurality of candidate values for sizes of the plurality of subbands. When the RI value is equal to or greater than a specific criterion, the sizes of the plurality of subbands are determined by a largest value of the plurality of candidate values.

Other subbands, except the one or more subbands for measuring the parameter values related to the channel state, among the plurality of subbands are dropped.

In another aspect, there is provided a method for receiving channel state information (CSI) in a wireless communication system, the method performed by a base station comprising transmitting, to a user equipment (UE), configuration information related to the channel state information, wherein the configuration information includes a number of a plurality of subbands allocated to the UE; and receiving, from the UE, channel state information of one or more subbands of the plurality of subbands including parameter values related to a channel state of the one or more subbands of the plurality of subbands measured based on the configuration information, wherein a number of the one or more subbands is determined based on a value of a rank indicator (RI).

Advantageous Effects

The present disclosure has an effect of efficiently reporting channel state information (CSI) by proving a method for reporting a channel state information payload exceeding resources configured to a UE.

The present disclosure also has an effect of efficiently reporting CSI by providing a method for distributing and reporting CSI on a time domain.

The present disclosure also has an effect of efficiently reporting CSI by providing a method for distributing and reporting CSI on a frequency domain.

Advantages which can be obtained in the present disclosure are not limited to the aforementioned effects and other unmentioned advantages will be clearly understood by those skilled in the art from the following description.

DESCRIPTION OF DRAWINGS

The accompanying drawings, that are included to provide a further understanding of the present disclosure and are incorporated in and constitute a part of the present disclosure, illustrate embodiments of the present disclosure and together with the description serve to explain various principles of the present disclosure.

FIG. 1 illustrates an example of an overall system structure of NR to which a method proposed in the present disclosure is applicable.

FIG. 2 illustrates a relationship between an uplink frame and a downlink frame in a wireless communication system to which a method described in the present disclosure is applicable.

FIG. 3 illustrates an example of a resource grid supported in a wireless communication system to which a method described in the present disclosure is applicable.

FIG. 4 illustrates examples of a resource grid per antenna port and numerology to which a method described in the present disclosure is applicable.

FIG. 5 illustrates a self-contained subframe structure in the wireless communication system to which a method described in the present disclosure is applicable.

FIG. 6 illustrates a transceiver unit model in the wireless communication system to which a method described in the present disclosure is applicable.

FIG. 7 illustrates a hybrid beamforming structure in terms of TXRU and a physical antenna in the wireless communication system to which a method described in the present disclosure is applicable.

FIG. 8 illustrates an example of a beam sweeping operation to which a method described in the present disclosure is applicable.

FIG. 9 illustrates an example of an antenna array to which a method proposed in the present disclosure is applicable.

FIG. 10 illustrates an example of a method for distributing and reporting channel state information on a time domain described in the present disclosure.

FIG. 11 is a flow chart illustrating an operation method of a user equipment performing a method for reporting channel state information described in the present disclosure.

FIG. 12 is a flow chart illustrating an operation method of a base station performing a method for receiving channel state information described in the present disclosure.

FIG. 13 illustrates a block configuration diagram of a wireless communication device to which methods described in the present disclosure are applicable.

FIG. 14 illustrates another example of a block configuration diagram of a wireless communication device to which methods described in the present disclosure are applicable.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

The 5G NR defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

The 5G NR supports various subcarrier spacings and supports CP-OFDM on downlink and CP-OFDM and DFT-s-OFDM (SC-OFDM) on uplink.

Embodiments of the disclosure may be supported by the standard documents disclosed in IEEE 802, 3GPP, and 3GPP2 which are radio access systems. In other words, in the embodiments of the disclosure, steps or parts skipped from description to clearly disclose the technical spirit of the present disclosure may be supported by the above documents. All the terms disclosed herein may be described by the standard documents.

For the clear description, embodiments of the present disclosure will be described focusing on 3GPP LTE/LTE-A/New Radio (NR), but the technical features of the present disclosure are not limited thereto.

In the present disclosure, 'A/B' or 'A and/or B' can be interpreted in the same sense as 'including at least one of A or B'.

An example of 5G usage scenarios to which a method descibed in the present disclosure is applicable is described below.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one subcarrier spacing in a frequency domain. By scaling a reference subcarrier spacing by an integer N, different numerologies can be defined.

NR: NR Radio Access or New Radio

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$ and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/100) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{subframe}^{slots,\mu}-1\}$ in a radio frame. One slot is composed of continuous OFDM symbols of $N_{sYmb}^\mu$, and $N_{sYmb}^\mu$ is determined depending on a numerology in use and slot configuration. The start of slots $n_s^\mu$ in a subframe is temporally aligned with the start of OFDM symbols $n_s^\mu N_{sYmb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |

TABLE 3-continued

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^\mu N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 4, one resource grid may be configured for the numerology μ and an antenna port p.

FIG. 4 illustrates examples of a resource grid per antenna port and numerology to which a method described in the present disclosure is applicable.

Each element of the resource grid for the numerology μ and the antenna port p is indicated as a resource element, and may be uniquely identified by an index pair (k,l̄). Herein, $k=0, \ldots, N_{RB}^\mu N_{sc}^{RB}-1$ is an index in the frequency domain, and $l̄=0, \ldots, 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,l̄) for the numerology μ and the antenna port p corresponds to a complex value $a_{k,l̄}^{(p,\mu)}$. When there is no risk of confusion or when a specific antenna port or numerology is specified, the indexes p and μ may be dropped and thereby the complex value may become $a_{k,l̄}^{(p)}$ or $a_{k,l̄}$.

In addition, a physical resource block is defined as $N_{sc}^{RB}$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l̄) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Slot Structure

In order to minimize data transmission latency in a TDD system, 5th generation (5G) new RAT (NR) considers a self-contained subframe structure as illustrated in FIG. 5.

That is, FIG. 5 illustrates an example of a self-contained structure to which a method described in the present disclosure is applicable.

In FIG. 5, a hatched portion 510 represents a downlink control area, and a black portion 520 represents an uplink control area.

A non-hatched portion 530 may be used for downlink data transmission or for uplink data transmission.

Such a structure is characterized in that DL transmission and UL transmission are sequentially performed in one slot, and the transmission of DL data and the transmission and reception of UL ACK/NACK can be performed in one slot.

The slot described above may be defined as 'self-contained slot'.

That is, through such a slot structure, a base station can reduce the time it takes to retransmit data to a UE when a data transmission error occurs, and hence can minimize a latency of final data transfer.

In the self-contained slot structure, a time gap is necessary for the base station and the UE to switch from a transmission mode to a reception mode or to switch from the reception mode to the transmission mode.

To this end, some OFDM symbols at a time of switching from DL to UL in the self-contained slot structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 6 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 6(a), or as a TXRU virtualization model option-2: full-connection model.

Referring to FIG. 6(a), in the sub-array partition model, the antenna elements are divided into multiple antenna element groups, and each TXRU may be connected to one of the multiple antenna element groups. In this case, the antenna elements are connected to only one TXRU.

Referring to FIG. 6(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 6, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 6 is merely an example, and the present disclosure is not limited thereto and may be equivalently applied even to mapping of TXRUs and antenna elements which can be implemented in a variety of hardware forms.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

FIG. 7 is a diagram illustrating a hybrid beamforming structure in terms of TXRU and a physical antenna in the wireless communication system to which the method proposed in the present disclosure may be applied.

In FIG. 7, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 7, when N specific TXRUs and M specific RF antennas are defined as one antenna panel, a scheme that introduces a plurality of antenna panels capable of independent hybrid beamforming is also considered in the New RAT system.

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Virtualization of Reference Signal (RS)

In the mmW, it is possible to transmit a PDSCH only in one analog beam direction at a time by analog beamforming. In this case, data transmission from the BS is possible only to a small number of UEs in the corresponding direction. Therefore, if necessary, the analog beam direction is differently configured for each antenna port so that data transmission can be simultaneously performed to a plurality of UEs in several analog beam directions.

FIG. 8 is a diagram illustrating an example of a beam sweeping operation to which the method proposed in the present disclosure may be applied.

As described in FIG. 7, when the BS uses a plurality of analog beams, a beam sweeping operation is considered, which allows all UEs to have a reception opportunity by changing a plurality of analog beams to which the BS intends to apply in a specific subframe according to the symbol at least with respect to a synchronization signal, system information, and a paging signal because an analog beam which is advantageous for signal reception for each UE.

FIG. 8 illustrates an example of a beam sweeping operation for a synchronization signal and system information in a downlink transmission process. In FIG. 8, a physical resource (or physical channel) through which the system information is transmitted in a broadcasting scheme in the New RAT is referred to as physical broadcast channel (xPBCH).

In this case, analog beams belonging to different antenna panels within one symbol may be simultaneously transmitted and discussed is a scheme that introduces a beam reference signal (BRS) which is a reference signal transmitted, to which a single analog beam (corresponding to a specific antenna panel) is applied as illustrated in FIG. 8 to measure channels depending on the analog beam.

The BRS may be defined for a plurality of antenna ports and each antenna port of the BRS may correspond to the single analog beam.

In this case, unlike the BRS, the synchronization signal or xPBCH may be transmitted, to which all of the analog beams in the analog beam group are applied so that the signal may be well received by random UEs.

RRM Measurement

The LTE system supports RRM operations including power control, scheduling, cell search, cell reselection, handover, radio link or connection monitoring, connection establishment/re-establishment, and the like.

In this case, the serving cell may request RRM measurement information, which is a measurement value for performing the RRM operations, to the UE.

For example, the UE may measure information including cell search information for each cell, reference signal received power (RSRP), reference signal received quality (RSRQ), and the like and report the measured information to the BS.

Specifically, in the LTE system, the UE receives 'measConfig' as a higher layer signal for RRM measurement from the serving cell. The UE measures the RSRP or RSRQ according to 'measConfig'.

The RSRP, the RSRQ, and the RSSI are defined as below.

RSRP: The RSRP may be defined as a linear average of a power contribution [W] of a resource element carrying a cell specific reference signal within a considered measurement frequency bandwidth. A cell specific reference signal R0 may be used for deciding the RSRP. When the UE may reliably detect that R1 is available, the UE may decide the RSRP by using R1 in addition to R0.

A reference point of the RSRP may be an antenna connector of the UE.

When receiver diversity is used by the UE, a reported value need not be smaller than the RSRP corresponding to a random individual diversity branch.

RSRQ: The reference signal received quality (RSRQ) is defined as a ratio N×RSRP/(E-UTRA carrier RSSI) and N represents the number of RBs of an E-UTRA carrier RSSI measurement bandwidth. Measurements of numerator and denominator should be performed through the same set of resource blocks.

The E-UTRA carrier received signal strength indicator (RSSI) is received through a block by the UE from all sources including N resource adjacent channel interference, thermal noise, etc., in a linear average of the total received power [W] measured only in an OFDM symbol containing a reference symbol for antenna port 0 and a measurement bandwidth.

When the higher layer signaling represents a specific subframe for performing the RSRQ measurement, the RSSI is measured for all OFDM symbols in the indicated subframe.

The reference point for THE RSRQ should be the antenna connector of the UE.

When the receiver diversity is used by the UE, the reported value should not be smaller than the corresponding RSRQ of the random individual diversity branch.

RSSI: The RSSI means received broadband power including thermal noise and noise generated at the receiver within a bandwidth defined by a receiver pulse shaping filter.

The reference point for measuring the RSSI should be the antenna connector of the UE. When the receiver diversity is used by the UE, the reported value should not be smaller than the corresponding UTRA carrier RSSI of the random individual receive antenna branch.

According to such a definition, the UE which operates in the LTE system may be allowed to measure the RSRP in a bandwidth corresponding to one of 6, 15, 25, 50, 75, and 100 resource blocks (RBs) through an information element (IE) related with an allowed measurement bandwidth transmitted system information block type 3 (SIB3) in the case of intra-frequency measurement and through an allowed measurement bandwidth transmitted in SIB5 in the case of inter-frequency measurement.

Alternatively, in the absence of such an IE, the measurement may be performed in a frequency band of the entire downlink (DL) system by default. In this case, when the UE receives the allowed measurement bandwidth, the UE may consider the corresponding value as a maximum measurement bandwidth and arbitrarily measure the value of the RSRP within the corresponding value.

However, when the serving cell transmits an IE defined as WB-RSRQ and the allowed measurement bandwidth is set to 50 RB or more, the UE needs to calculate the RSRP value for the entire allowed measurement bandwidth. Meanwhile, the RSSI may be measured in the frequency band of the receiver of the UE according to the definition of the RSSI bandwidth.

FIG. 9 is a diagram illustrating an example of an antenna array to which the method proposed in the present disclosure may be applied.

Referring to FIG. 9, the normalized panel antenna array may be constituted by Mg panels and Ng panels in a horizontal domain and a vertical domain, respectively.

In this case, one panel is constituted by M columns and N rows, respectively, and an X-pol antenna is assumed in FIG. 9. Therefore, the total number of antenna elements may be 2*M*N*Mg*Ng.

In an environment such as new RAT, high resolution feedback is considered for the purpose of more accurate channel state information (CSI) feedback.

The high resolution feedback may mean, for example, linear combination (LC), covariance feedback, etc.

In such a high resolution codebook, a codebook design for efficiently reducing a payload and/or a method for efficiently distributing and reporting or omitting a payload may be important.

Accordingly, the present disclosure describes a method for efficiently distributing and reporting the total payload when reporting CSI using the high resolution codebook.

The present disclosure mainly describes Type II CSI feedback, i.e., LC codebook supported in NR, but it can be applied to a codebook construction method, such as normal Type I, and/or beam based reporting.

The construction of the LC codebook is described as follows.

A two-dimensional (2D) discrete Fourier transform (DFT) beam to be applied to a 2D antenna array in one panel is defined as the following Equation 2.

$$w_{m_1,m_2} = \frac{v_{m_1} \otimes u_{m_2}}{\sqrt{N_1 N_2}}$$ [Equation 2]

$$v_{m_1} = \left[1 \quad \exp\left(j\frac{2\pi m_1}{o_1 N_1}\right) \quad \ldots \quad \exp\left(j\frac{2\pi m_1(N_1-1)}{o_1 N_1}\right)\right]^T$$

-continued $$u_{m_2} = \left[1 \quad \exp\left(j\frac{2\pi m_2}{o_2 N_2}\right) \quad \ldots \quad \exp\left(j\frac{2\pi m_2(N_2-1)}{o_2 N_2}\right)\right]^T$$

In Equation 2, m1 is an index of 1D-DFT codebook of a first domain, and m2 is an index of 1D-DFT codebook of a second domain.

Variables used in Equation 2 are as follows.

N1 is the number of antenna ports per polarization (pol) of a first dimension in a panel.

N2 is the number of antenna ports per polarization (pol) of a second dimension in a panel.

O1 is an oversampling factor of the first dimension in a panel.

O2 is an oversampling factor of the second dimension in a panel.

The above Equation 2 represents that port indexing is first performed on N2 domain, but can be extended to the case in which the port indexing is first performed on N1 domain.

For the construction of the LC codebook represented as Type II CSI feedback in NR, the 2D-DFT beam (the 2D-DFT beam also includes a 1D-DFT beam and is hereinafter described as a DFT beam) defined by the above Equation 2 may be used.

Such a construction method of the LC codebook may be determined by the following Equation 3.

The following Equation 3 shows an example of rank 1 codebook construction.

$$W^{(1)} = \frac{1}{\sqrt{\eta}} \begin{bmatrix} b_1 \ldots b_L & 0 \\ 0 & b_1 \ldots b_L \end{bmatrix} \begin{bmatrix} p_1 & 0 & 0 \\ 0 & \ddots & 0 \\ 0 & 0 & p_{2L} \end{bmatrix} \begin{bmatrix} c_1 \\ \vdots \\ c_{2L} \end{bmatrix}$$ [Equation 3]

In Equation 3, $b_i$ denotes an i-th base beam vector constructing the LC codebook, where i is 1, ..., L, and may be replaced with the 2D-DFT beam using the above Equation 2 according to an embodiment and used.

Beams may be selected configured according to a specific rule in GoB (Grid of Beam) of the 2D-DFT beam spanned by the above Equation 2.

For example, L beams may be selected from a set of most preferred orthogonal DFT beams in a given channel, where L is the number of combining beams. In this instance, L may be configured via higher layer signalling (e.g., RRC signalling), or separately reported by the UE.

The above example describes that the same beam group {$b_i$} is configured for each polarization, but different beam groups may be used, if necessary or desired.

In the above Equation 3, a value of $p_k$ denotes a relative amplitude coefficient of a k-th beam when linear combining is performed, where k is 1, 2L, and is L beams per polarization.

For example, the value of $p_k$ may have value of $\{1, \sqrt{0.5}, \sqrt{0.25}\}$.

In the above Equation 3, a value of $c_k$ denotes a relative phase coefficient of a k-th beam when linear combining is performed, where k is 1, 2L, and is L beams per polarization.

For example, the value of $c_k$ may have value of $\{1, j, -1, j\}$.

The value of $c_k$ may be represented by a relative magnitude based on a specific strongest beam (e.g., a beam having a largest value of amplitude coefficients of linear combining beams), in order to save the payload.

In this instance, an amplitude and a phase of the specific strongest beam may be fixed to a specific value (e.g., 1).

In the above Equation 3, η denotes a codebook normalization factor and performs a function of making power of the codebook to be 1 (i.e., Frobenius norm of a final codebook is 1).

In addition, η may perform normalization for each layer.

The LC codebook constructed by the above Equation 3 may independently construct a codebook for each layer.

However, in this instance, there may occur a problem in that the size of a payload required for the codebook construction increases in multiples as a rank increases.

In addition, granularity of a codebook parameter may increase in order to increase the accuracy of the LC codebook.

For example, granularities of the number L of combining beams, $p_k$, and $c_k$ may increase.

However, if the granularity of the codebook parameter increases, there may be a problem in that the size of the payload greatly increases as a benefit in return.

Accordingly, the present disclosure proposes a method, in which when an increasing payload, i.e., a size of a payload in a codebook based feedback is greater than a size of a resource allocated from a base station for the feedback, the payload is distributed and reported on a time domain and/or a frequency domain.

In this instance, the allocated resource may be a resource on a physical uplink control channel (PUCCH) and/or a physical uplink shared channel (PUSCH).

(Method 1)—Time Domain Payload Balancing

The existing CSI report is that CRS-RS indicator (CRI)/rank indicator (RI)/precoding matrix indicator (PMI)/channel quality information (CQI)/layer indicator (LI) or CRI/RSRP (in case of beam related CSI report) on one slot is reported on PUCCH and/or PUSCH.

If PUCCH and/or PUSCH resource for the CSI report is less than a CSI payload size, a report corresponding to a specific subband (SB) or a component carrier (CC) uses an omission method according to a priority rule.

However, the related art method has a problem that a large loss is caused due to CSI omission.

Accordingly, the present disclosure proposes a method for a UE to distribute a payload on a time domain and report CSI, in order to reduce the loss caused by the CSI omission.

FIG. 10 illustrates distributing and reporting CSI on a time domain described in the present disclosure.

Referring to FIG. 10, $1^{st}$, $2^{nd}$ N-th CSI reports may be transmitted over consecutive N-slots, or periodically transmitted on non-consecutive N-slots.

Alternatively, the CSI reports may be transmitted on N slots according to a previously promised transmission pattern.

Herein, information for the N value may be configured by the base station, or the UE may additionally feedback the N value to the base station while transmitting the first CSI report to the base station.

(Method 1-1)

CSI content of each i-th report may be comprised of a PMI corresponding to an i-th layer, and a first CSI report may be comprised of RI/CQI/PMI (for first layer).

As described above, in the LC codebook based CSI report, as the number of layers increases, a size of its payload almost linearly increases depending on the number of layers.

In order to solve such a problem, the Method 1-1 of the present disclosure proposes a method for distributing the PMI corresponding to each layer on different slots.

The RI and the CQI transmitted in the first CSI report are values calculated considering the final PMI transmitted over N slots, and the base station and the UE can understood it.

In NR, if the CSI report is a wideband (WB) report based on short PUCCH or long PUCCH, CRI/RI/PMI/CQI/LI is encoded and reported while having a separate field without part division.

For the long PUCCH subband report or the PUSCH report, it is divided into two parts and is reported.

Specifically, it may be divided into Part 1 of CRI/RI/1st CQI/# of non-zero amplitude combining beams (only for Type II CSI) and Part 2 of PMI and second CQI, and may be separately encoded and reported for each part.

Herein, the first CQI and the second CQI refer to CQI corresponding to a first codeword (CW) and a second CW, respectively, and # of non-zero amplitude combining beams denotes the number of beams when $p_k$, that is an amplitude of the above-described 2L combining beams, has a non-zero value.

Accordingly, if the method 1-1 is used, the short PUCCH based report or the long PUCCH based wideband report may perform a report subsequent to the second CSI report by newly introducing PMI only report quantity.

In the long PUCCH based subband report or the PUSCH based report, only Part 2 may be transmitted.

In this instance, PMI information (e.g., information related to combining beam, WB amplitude information, etc.) of wideband may be included only in the first CSI report.

(Method 1-2)

The UE may report information for X layers to CSI content of each i-th report.

In this instance, whether the UE reports information for the layers may be previously promised by the base station and the UE, or may be indicated to the UE via the higher layer (e.g., RRC/MAC CE/DCI).

When using the method 1-1, the UE performs the CSI report over four slots if a rank calculated from a CSI reference resource is 4.

In this case, there may occur a problem of performance reduction since information of CSI may be outdated and does not match previously transmitted information (old CSI report).

In order to solve this, the UE will be able to perform the reporting by including information of M layers in one CSI report.

In this case, the number N of slots on which the CSI report is performed may be calculated by ceil(RI/M), and RI is a value of RI that is fed back in the first report.

ceil(x) denotes a ceiling function. For example, ceil(2.4) is calculated as 3.

More smoothly, the base station and the UE may previously promise whether to transmit information on how many layers on a specific slot, or the base station may inform the UE via the higher layer signalling.

For example, if N=2, M1=1, and M2=3, where Mk is the number of layers included in a k-th CSI report, the CSI report may be transmitted over two slots. In this case, a first report may have information of PMI about one layer, and a second report may report information for up to three layers.

If the number of layers that UE intends to transmit is 1, the second CSI report may be automatically omitted, or the reliability may increase by repeatedly transmitting the first report.

If the CSI report is omitted, the base station may implicitly determine it based on fed-back RI, or the UE may inform the base station of it via 1-bit flag.

Even in the case of repeated transmission, the UE may inform the base station of the repeated transmission using 1-bit flag, or the repeated transmission may be previously promised between the base station and the UE.

(Method 1-3)

CSI content of each i-th report may include {RI/CQI/PMI/LI}.

In this case, the base station and the UE may previously promise that PMI includes information corresponding to (up to) how many layers, or the base station may indicate it to the UE via the higher layer signalling.

Further, 1) RI is an indicator indicating that information on how many layers is included in PMI of the corresponding report, or 2) RI may represent the total number of layers transmitted over all the N-slot reports.

For the 2), the base station and the UE may previously promise that information on (up to) how many layers is transmitted in the i-th CSI report, or the base station may indicate it to the UE via the higher layer.

For the 1), the final RI may be calculated as a sum of RI reported in each CSI report.

If only information for one layer is contained in one CSI report, the number of reports may be the final RI.

In this instance, the CQI may be CQI calculated considering all the layers transmitted over the N-slot reports (in this case, a value of CQI is the same in all the CSI reports), or may be CQI calculated considering only the layer of each CSI report.

Alternatively, the CQI may be CQI that is recalculated as a value corresponding to accumulated layers of each CSI report. For example, if N=3, M1=1, M2=1, and M3=1, CQI calculated in a second CSI report is a value of CQI that is calculated considering a total of two layers transmitted in a first CSI report and the second CSI report (Method 1-4)

A layer corresponding to an LI may be comprised of a set of parameters having relatively higher granularity.

When the LI is reported, since the layer corresponding to the LI is the strongest layer among multiple layers, a PMI report for this may be more important than other layers.

Accordingly, in this case, parameters of PMI configuring the corresponding layer (layer corresponding to the LI) may have higher granularity than parameters configuring other layers.

Herein, the set of parameters may include # of combining beams (L), granularity of $p_k$, $c_k$, etc., and does not exclude other parameters.

Herein, # of combining beam (L) denotes the number of combining beams.

For example, if the number of combining beams L is 6, the strongest layer may configure a PMI using 3-bit amplitude and 3-bit phase and may be reported, and other layers of L=3 smaller than L=6 may be reported in a PMI configuration method using 2-bit amplitude and 2-bit phase.

When the LI is not transmitted, a codebook of previously promised specific layer(s) (e.g., based on the lowest layer) may be configured with a set of parameters having relatively higher granularity than other layers.

The LI currently indicates one layer, but when following the above-described method, a layer corresponding to the LI may be configured with a set of parameters having higher granularity for a specific layer group and may perform CSI.

Thus, the LI can extend its function and perform a function of a layer group indicator (LGI).

The above-described methods may be applied even to one-slot based reporting based on one general slot not the report on N slots.

Specifically, both when there is a LI report and when there is no LI report have a value (e.g., $p_k=1$) equal to or greater than a specific threshold included in a specific layer (e.g., strongest layer)

When other layers except the specific layer are independently configured, they may be configured except a combining beam.

In this instance, the base station may implicitly determine information of the excluded beam based on all the reported PMIs, or more specifically, the UE may report the information of the excluded beam as a separate PMI field.

For example, when RI=2 (comprised of layers 1 and 2, where the layer 1 is the strongest layer) and L=4 (b1, b2, b3, b4), and when amplitudes $p_k$ of beams constituting the layer 1 are 1, 0.5, 0.25, and 0.25, respectively, the layer 2 is configured using only L=3 (b2, b3, b4) and thus can reduce its payload size.

(Method 1-4-1)

A layer corresponding to the LI may be comprised of a set of parameters having relatively higher granularity, and CQI value corresponding to this may also be separately reported.

If the above-described method 1-4 is used, a SINR of layers corresponding to the LI has a good value. Therefore, because the base station is likely to use the layer(s) indicated to the corresponding LI/LGI from the scheduling perspective, information of CQI as well as PMI also need to be accurate.

Thus, CQI calculated considering only the layer indicated to the LI/LGI may be separately reported to the base station.

(Method 1-5)

To efficiently perform the above-described methods, the base station may allocate resources to the UE in units of slot burst of aperiodic CSI on PUSCH.

In the case of aperiodic CSI reporting, as method for informing a value of N and/or a pattern of N, the base station may extend a resource field in uplink grant DCI and inform the UE of it, and the base station may newly add a separate field called 'slot allocation filed' in the uplink grant DCI and inform the UE of it.

In this instance, sizes of the resources allocated by the base station may different for each slot.

(Method 1-6)

Method 1-6 is a method in which the base station can interpret that CSI transmitted in a first CSI report has a higher priority than a CSI report transmitted in other instances, and information that is fed back to a PMI of the first CSI report corresponds to a strongest layer.

According to the above-described method, if multi-shot transmission is performed for the CSI report, information corresponding to the first CSI report may have a priority compared to information of other instances.

In other words, when a collision occurs between a multi-shot CSI report and a single-shot CSI report, a first CSI report of the multi-shot CSI report has a higher priority than other reports.

The following Table 4 shows an example of the above-described priority agreed in NR ad-hoc meeting 1801.

TABLE 4

| NR ad-hoc meeting 1801 |
| --- |
| Agreement: |
| The following CSI priority rules apply: |
| Reports are first prioritized according to Rule #1, then according to Rule #2 if they have the same priority according to Rule #1, and so forth . . . |

TABLE 4-continued

NR ad-hoc meeting 1801

Rule #1: Time-domain behaviour/channel (AP-CSI > SP-CSI on PUSCH > SP-CSI on PUCCH > P-CSI)
Rule #2: CSI content (Beam reports > CSI)
Applies only for all periodic reports and semi-persistent reports intended for PUCCH
Rule #3: cellID (PCell > PSCell > other cell IDs in increasing order)
Applies only for all periodic reports and semi-persistent reports intended for PUCCH
Rule #4: csiReportID (in increasing order)
Applies only for all periodic reports and semi-persistent reports intended for PUCCH According to Table 4, reports are first prioritized according to Rule #1, the reports are prioritized according to Rule #2 if they have the same priority according to the Rule #1, the reports are prioritized according to Rule #3 if they have the same priority according to the Rule #2, and the reports are prioritized according to Rule #4 if they have the same priority according to the Rule #3.

The Rule #1 is a rule of determining a priority according to time (period) and channel.

According to the Rule #1, aperiodic CSI (AP-CSI) has a higher priority than semi-persistent CSI (SP-CSI), and the SP-CSI has a higher priority than periodic CSI (p-CSI).

In this instance, a priority of the SP-CSI is determined according to the channel, and SP-CSI on PUSCH has a higher priority than SP-CSI on PUCCH.

The Rule #2 is a rule of determining a priority according to content of CSI.

According to the Rule #2, beam reports have a higher priority than CSI.

The Rule #2 is applied to all periodic reports and SP-CSI reports on PUCCH.

The Rule #3 is a rule of determining a priority according to cell ID.

According to the Rule #3, PCell has a higher priority than PScell, and the PScell has a higher priority than other cell IDs (in increasing order of cell IDs).

The Rule #3 is applied to all periodic reports and SP-CSI reports on PUCCH.

The Rule #4 is a rule of determining a priority according to increasing order of csiReport ID.

The Rule #4 is applied to all periodic reports and SP-CSI reports on PUCCH.

As an example of the priority described in the present disclosure, a first CSI report in a multi-shot CSI report that is a medium priority of Rule #1 and Rule #2 of the above Table 4 may have a higher priority than a single CSI report, and the single CSI report may have a higher priority than an n-th CSI report in the multi-shot CSI report, where n is greater than 1 (i.e., 1st CSI report in multi-shot CSI report>single CSI report>n-th (n>1) CSI report in multi-shot CSI report).

In addition, PMI information corresponding to the first CSI report is interpreted as the strongest layer, and LI reporting may be omitted.

(Method 1-7)

When CSI reporting is performed by balancing a payload in a time domain, channels on which periodically or aperiodically reported CSI contents are carried may be multiple PUSCHs that are consecutively/non-consecutively triggered.

In this instance, CSI transmitted on PUSCH may be aperiodic CSI (A-CSI) and/or semi-persistent CSI (SP-CSI).

The CSI reporting may also use multiple PUCCH resources that have different offset values and have the same period.

To reduce the payload for this, PUSCH and PUCCH may be combined.

(Method 1-7-1)

To optimize a payload of method 1-7, a first CSI report may be reported using PUSCH resource.

For an n-th CSI report (where n>1), the UE may report n-th CSI using PUSCH resource or PUCCH resource that is less than a capacity of the PUSCH resource configured for the first CSI report.

In this instance, the UE may report only a differential value of first CSI in the case of n-th CSI reporting.

In other words, reporting only the differential value of the first CSI means that the UE can report other CSI, except a reported value upon the first CSI reporting, as the n-th CSI report.

For example, in the case of first CSI reporting, it may be designed so that the UE reports full PMI information to the base station through PUSCH reporting, and reports only other information, except PMI information transmitted in the first CSI report, through other n-th CSI reports.

Hence, there is an effect of saving the payload.

If wideband PMI and PMI information for all configured subbands are contained in the first CSI report, the wideband PMI may be reused as it is in the n-th CSI report.

If a differential value of PMI for subband is a valid range, the UE may report the corresponding differential (e.g., amplitude/phase difference) value and/or an index of subband corresponding to differential PMI.

(Method 1-7-2)

A PMI may be represented as follows by dividing attributes of the PMI: PMI=PMI1+PMI2+ . . . +PMI_N.

In this instance, only reporting for a specific PMI or a specific number of PMIs may be performed in one CSI report. Upon CQI calculation, information for a not-reported PMI may be calculated using a most recently reported PMI value among reports before the above transmission time or assuming a specific default value.

For example, assuming N=2, the UE may report the PMI to the base station by dividing the PMI into WB_PMI, SB_odd_PMI (subband PMI corresponding to odd-numbered subband), and SB_even_PMI (subband PMI corresponding to even-numbered subband).

The UE may report only WB_PMI and SB_odd_PMI in the first CSI report, and report only information for SB_even_PMI in the second CSI report.

Upon the first CSI reporting, the UE may calculate the CQI using a default value or a previously promised value as WB_PMI, SB_odd_PMI, and SB_even_PMI that is not transmitted, and may report the calculated CQI.

Upon the second CSI reporting, the UE may calculate the CQI using information of reported SB_even_PMI and information of WB_PMI and SB_odd_PMI in the first CSI report, and may report the calculated CQI to the base station.

In the above-described method, the base station and the UE may previously promise what PMI content to include, or the UE may add a specific PMI field and inform the base station of it.

For example, if a 1-bit indicator of the PMI field is reported as "0", it may represent WB_PMI and SB_odd_PMI. And, if the 1-bit indicator of the PMI field is reported as "1", it may represent SB_even_PMI.

A new payload balancing method may be configured by a combination of the above-described methods, and the methods can be applied to codebook based implicit feedback such as Type I codebook construction as well as Type II codebook.

In the above-described time domain, a method (method 1) for the payload balancing may be applied in a high mobility situation.

For example, the method 1 may be applied in relation to V2X CSI transmission.

(Method 2)—Payload Reduction in Frequency Domain

The method 1 described above relates to a method for distributing a payload on a time domain.

The following method 2 describes a method for reducing a payload on a frequency domain.

(Method 2-1)

A UE may receive, from a base station, configuration information for a CSI report.

The configuration information that the base station transmits to the UE may include information about the number of subbands to be allocated to the UE, a subband size, etc.

In addition, the base station may transmit, to the UE, information for a subband to measure a channel state.

The method 2-1 is a method, which can independently determine, depending on a RI, the number of reported subbands regardless of the number of subbands configured for each layer, when the UE is configured and/or applied so that the UE reports CSI for a subband.

For example, assuming the number of subbands, with which the UE is configured from the base station, is 10, the UE may report PMI and/or CQI that are parameters related to a channel state for 12 subbands when the RI is 1, report PMI and/or CQI for 6 subbands when the RI is 2, and report PMI and/or CQI for 3 subbands when the RI is 4.

In other words, the number of subbands, in which CSI is calculated, may be determined by the RI, regardless of the number of subbands to measure a channel state that the base station configures to the UE.

Herein, the subband reduced as the RI increases may be interpreted as an omission, and the omission may be interpreted as the same meaning as a drop.

In addition, the UE may determine subbands to measure the channel state through a comb configuration.

For example, the UE may perform only CSI report for the even numbered subbands according to Comb2 when the RI is 2, and may perform only CSI report every four subbands according to Comb4 when the RI is 4.

That is, in order to solve ambiguity of PMI and/or CQI corresponding to the omitted/dropped subband, a size of the subband may be newly retuned.

When the RI is 2, the UE may newly combine two consecutive or non-consecutive subbands to configure one new subband, and report PMI and/or CQI for a total of six subbands that are newly configured.

When the RI is 4, the UE may combine four consecutive or non-consecutive subbands to configure one new subband, and perform reporting for PMI and/or CQI for a total of three subbands that are newly configured.

A consecutive or non-consecutive pattern may be previously promised between the base station and the UE, and may be signalled from the base station.

The number of subbands to measure the channel state may be determined depending on the multiple of the RI, and the size and/or the comb pattern of the subband may be determined by a previously determined value.

(Method 2-2)

When the UE performs the reporting at a specific RI or more, a subband size may be a specific default value regardless of a value configured via RRC signalling.

The UE performs the CSI reporting for the subband using the subband size having the specific default value.

The following Table 5 represents values for the subband size configured by RRC in the NR system defined in the 3GPP standard.

TABLE 5

| Carrier bandwidth part (PRBs) | Subband size (PRBs) |
| --- | --- |
| <24 | N/A |
| 24-72 | 4, 8 |
| 73-144 | 8, 16 |
| 145-275 | 16, 32 |

According to the above Table 5, in the NR, the UE receives values tor the subband size from the base station via RRC signalling.

The method 2-2 is a method, in which even if the UE is configured with a small value of the subband size from the base station, the UE reports PMI and/or CQI for the corresponding subband using a specific default value as the subband size regardless of the RRC signalling when a currently reported value of RI is equal to or greater than a specific value (e.g., 3), in order to reduce the total overhead.

For example, the UE may receive information for the subband size from the base station.

The subband size may consist of a plurality of candidate values.

For example, in the above Table 5, when the carrier bandwidth part is 24-72, the candidate values of the subband size may be 4 and 8.

When the RI value is equal to or greater than 3, the larger value (8) among the configured subband size candidate values (4, 8) may be configured as the default value.

Separate default values may be configured by adding a row for the default value to the above Table 5, as the following Table 6.

TABLE 6

| Carrier bandwidth part (PRBs) | Subband size (PRBs) | Default size (PRBs) |
| --- | --- | --- |
| <24 | N/A | N/A |
| 24-72 | 4, 8 | 16 |
| 73-144 | 8, 16 | 32 |
| 145-275 | 16, 32 | 32 |

For example, when the RI is equal to or greater than 3 and the carrier bandwidth part is 24-72, the default value may be set to 16 according to Table 6.

FIG. 11 is a flow chart illustrating an operation method of a UE performing a method described in the present disclosure.

That is, FIG. 11 illustrates a method for a UE to report channel state information (CSI) in a wireless communication system.

The UE first receives, from a base station, configuration information related to the channel state information in S1110.

The configuration information related to the channel state information may include the number of a plurality of subbands allocated to the UE.

Next, the UE measure parameter values related to a channel state of one or more subbands of the plurality of subbands based on the configuration information in S1120.

Next, the UE reports, to the base station, channel state information of the one or more subbands including the measured parameter values in S1130.

The number of the one or more subbands may be determined based on a value of a rank indicator (RI).

The number of the one or more subbands may be determined by dividing the number of the plurality of subbands by the RI value.

The reporting of the channel state information of the one or more subbands may be performed at a specific subband interval based on the number of the one or more subbands.

Each of the one or more subbands may be comprised of a combination of two or more subbands of the plurality of subbands based on the RI value.

The configuration information may include information for sizes of the plurality of subbands. When the RI value is equal to or greater than a specific criterion, the sizes of the plurality of subbands may be determined by a pre-configured value regardless of the configuration information.

The configuration information may include a plurality of candidate values for the sizes of the plurality of subbands. When the RI value is equal to or greater than the specific criterion, the sizes of the plurality of subbands may be determined by a largest value of the plurality of candidate values.

Other subbands except the one or more subbands, that measure the parameter values related to the channel state, among the plurality of subbands may be dropped.

With reference to FIGS. 11, 13 and 14, a description is given, in which reporting of channel state information (CSI) in a wireless communication system described in the present disclosure is implemented by a user equipment (UE).

The UE reporting the channel state information in the wireless communication system may include a radio frequency (RF) module configured to transmit and receive a radio signal, and a processor functionally connected to the RF module.

The processor of the UE controls the RF module to receive, from a base station, configuration information related to the channel state information.

The configuration information may include the number of a plurality of subbands allocated to the UE.

The processor of the UE controls the RF module to measure parameter values related to a channel state of one or more subbands of the plurality of subbands based on the configuration information.

The processor of the UE controls the RF module to report, to the base station, channel state information of the one or more subbands including the measured parameter values.

The number of the one or more subbands may be determined based on a value of a rank indicator (RI).

The number of the one or more subbands may be determined by dividing the number of the plurality of subbands by the RI value.

The reporting of the channel state information of the one or more subbands may be performed at a specific subband interval based on the number of the one or more subbands.

Each of the one or more subbands may be comprised of a combination of two or more subbands of the plurality of subbands based on the RI value.

The configuration information may include information for sizes of the plurality of subbands. When the RI value is equal to or greater than a specific criterion, the sizes of the plurality of subbands may be determined by a pre-configured value regardless of the configuration information.

The configuration information may include a plurality of candidate values for the sizes of the plurality of subbands. When the RI value is equal to or greater than the specific criterion, the sizes of the plurality of subbands may be determined by a largest value of the plurality of candidate values.

Other subbands except the one or more subbands, that measure the parameter values related to the channel state, among the plurality of subbands may be dropped.

FIG. 12 is a flow chart illustrating an operation method of a base station performing a method described in the present disclosure.

That is, FIG. 12 illustrates a method for a base station to receive channel state information in a wireless communication system.

The base station first transmits, to a UE, configuration information related to the channel state information in S1210.

The configuration information may include the number of a plurality of subbands allocated to the UE.

Next, the base station receives, from the UE, channel state information of one or more subbands of the plurality of subbands including parameter values related to a channel state of the one or more subbands of the plurality of subbands measured based on the configuration information in S1220.

The number of the one or more subbands may be determined based on a value of a rank indicator (RI).

With reference to FIGS. 12 to 14, a description is given, in which reception of channel state information (CSI) in a wireless communication system described in the present disclosure is implemented by a base station.

The base station receiving the channel state information in the wireless communication system may include a radio frequency (RF) module configured to transmit and receive a radio signal, and a processor functionally connected to the RF module.

The processor of the base station controls the RF module to transmit, to a UE, configuration information related to the channel state information.

The configuration information may include the number of a plurality of subbands allocated to the UE.

The processor of the base station controls the RF module to receive, from the UE, channel state information of one or more subbands of the plurality of subbands including parameter values related to a channel state of the one or more subbands of the plurality of subbands measured based on the configuration information The number of the one or more subbands may be determined based on a value of a rank indicator (RI).

The respective embodiments or the respective methods described above can be separately performed, and can be performed through a combination of one or more embodiments or methods to implement a method described in the present disclosure.

Overview of Device to which the Present Disclosure is Applicable

A device to which the present disclosure is applicable is described below.

FIG. 13 illustrates a wireless communication device according to an embodiment of the present disclosure.

Referring to FIG. 13, a wireless communication system may include a first device 1310 and a second device 1320.

The first device 1310 may be a base station, a network node, a transmitter UE, a receiver UE, a wireless device, a wireless communication device, a vehicle, a vehicle with an autonomous driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field, or the like.

The second device 1320 may be a base station, a network node, a transmitter UE, a receiver UE, a wireless device, a wireless communication device, a vehicle, a vehicle with an autonomous driving function, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field, or the like.

For example, the UE may include a cellular phone, a smart phone, a laptop computer, a digital broadcast terminal, a personal digital assistant (PDA), a portable multimedia player (PMP), a navigator, a slate PC, a tablet PC, an ultrabook, a wearable device (e.g., a smart watch, a smart glass, a head mounted display (HMD)), or the like. For example, the HMD may be a display device worn on the head. For example, the HMD may be used to implement the VR, AR, or MR device.

For example, the drone may be a flight vehicle that flies by a radio control signal without a person being on the flight vehicle. For example, the VR device may include a device that implements an object or a background, etc. of a virtual world. For example, the AR device may include a device implemented by connecting an object or a background of a virtual world to an object or a background, etc. of a real world. For example, the MR device may include a device implemented by merging an object or a background of a virtual world with an object or a background, etc. of a real world. For example, the hologram device may include a device that records and reproduces stereoscopic information to implement a 360-degree stereoscopic image by utilizing a phenomenon of interference of light generated when two laser beams called holography meet. For example, the public safety device may include a video relay device or a video device that can be worn on the user's body. For example, the MTC device and the IoT device may be a device that does not require a person's direct intervention or manipulation. For example, the MTC device and the IoT device may include a smart meter, a vending machine, a thermometer, a smart bulb, a door lock, a variety of sensors, or the like. For example, the medical device may be a device used for the purpose of diagnosing, treating, alleviating, handling or preventing a disease. For example, the medical device may be a device used for the purpose of diagnosing, treating, alleviating or correcting an injury or a disorder. For example, the medical device may be a device used for the purpose of testing, substituting or modifying a structure or a function. For example, the medical device may be a device used for the purpose of controlling pregnancy. For example, the medical device may include a medical device, a surgical device, a (in vitro) diagnostic device, a hearing aid or a device for a surgical procedure, and the like. For example, the security device may be a device installed to prevent a possible danger and to maintain safety. For example, the security device may include a camera, CCTV, a recorder, or a black box, and the like. For example, the FinTech device may be a device capable of providing financial services, such as mobile payment. For example, the FinTech device may include a payment device, point of sales (POS), or the like. For example, the climate/environment device may include a device for monitoring and predicting the climate/environment.

The first device 1310 may include at least one processor such as a processor 1311, at least one memory such as a memory 1312, and at least one transceiver such as a transceiver 1313. The processor 1311 may perform functions, procedures, and/or methods described above. The processor 1311 may perform one or more protocols. For example, the processor 1311 may perform one or more layers of a radio interface protocol. The memory 1312 is connected to the processor 1311 and may store various types of information and/or instructions. The transceiver 1313 is connected to the processor 1311 and may be configured to transmit and receive radio signals.

The second device 1320 may include at least one processor such as a processor 1321, at least one memory such as a memory 1322, and at least one transceiver such as a transceiver 1323. The processor 1321 may perform functions, procedures, and/or methods described above. The processor 1321 may perform one or more protocols. For example, the processor 1321 may perform one or more layers of a radio interface protocol. The memory 1322 is connected to the processor 1321 and may store various types of information and/or instructions. The transceiver 1323 is connected to the processor 1321 and may be configured to transmit and receive radio signals.

The memory 1312 and/or the memory 1322 may be connected inside or outside the processor 1311 and/or the processor 1321, respectively, and may be connected to another processor through various technologies, such as a wired or wireless connection.

The first device 1310 and/or the second device 1320 may have one or more antennas. For example, an antenna 1314 and/or an antenna 1324 may be configured to transmit and receive radio signals.

FIG. 14 illustrates another example of a block configuration diagram of a wireless communication device to which methods described in the present disclosure are applicable.

Referring to FIG. 14, a wireless communication system includes a base station 1410 and multiple UEs 1420 located in an area of the base station. The base station 1410 may be represented as a transmitter, and the UE 1420 may be represented as a receiver, or vice versa. The base station 1410 and the UE 1420 respectively include processors 1411 and 1421, memories 1414 and 1424, one or more Tx/Rx RF modules 1415 and 1425, Tx processors 1412 and 1422, Rx processors 1413 and 1423, and antennas 1416 and 1426. The processors implement functions, processes, and/or methods described above. More specifically, in DL (communication from the base station to the UE), an upper layer packet from a core network is provided to the processor 1411. The processor implements functionality of the L2 layer. In the DL, the processor provides the UE 1420 with multiplexing between a logical channel and a transport channel and radio resource allocation and is also responsible for signaling to the UE 1420. The transmit (Tx) processor 1412 implements various signal processing functions for the L1 layer (i.e., physical layer). The signal processing functions include coding and interleaving to facilitate forward error correction (FEC) at the UE. The coded and modulated symbols are split into parallel streams, and each stream is mapped to an OFDM subcarrier, multiplexed with a reference signal (RS) in time and/or frequency domain, and combined together using an Inverse Fast Fourier Transform (IFFT) to produce a physical channel carrying a time domain OFDMA symbol stream. The OFDMA stream is spatially precoded to produce multiple spatial streams. Each spatial stream may be provided to the different antenna 1416 via a separate Tx/Rx module (or transceiver 1415). Each Tx/Rx module may modulate an RF carrier with a respective spatial stream for transmission. At the UE, each Tx/Rx module (or transceiver 1425) receives a signal through the respective antenna 1426 of each Tx/Rx module. Each Tx/Rx module recovers information modulated onto an RF carrier and provides the information to the receive (Rx) processor 1423. The Rx processor implements various signal processing functions of the Layer 1. The Rx processor may perform spatial processing on the information to recover any spatial stream destined for the UE. If multiple spatial streams are destined for the UE, they may be combined into a single OFDMA symbol stream by the multiple Rx processors. The Rx processor converts the OFDMA symbol stream from the time domain to the frequency domain using a Fast Fourier Transform (FFT). The frequency domain signal includes a separate OFDMA symbol stream for each subcarrier of the OFDM signal. The symbols on each subcarrier and the reference signal are recovered and demodulated by determining the most likely signal constellation points transmitted by the base station. These soft decisions may be based on channel estimation values. The soft decisions are decoded and de-interleaved to recover data and control signals that are originally transmitted by the base station on the physical channel. The corresponding data and control signals are provided to the processor 1421.

UL (communication from the UE to the base station) is processed at the base station 1410 in a manner similar to the description associated with a receiver function at the UE 1420. Each Tx/Rx module 1425 receives a signal via the respective antenna 1426. Each Tx/Rx module provides an RF carrier and information to the Rx processor 1423. The processor 1421 may be associated with the memory 1424 that stores a program code and data. The memory may be referred to as a computer readable medium.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR system, the present disclosure can be applied to various wireless communication systems other than the 3GPP LTE/LTE-A/NR system.

The invention claimed is:

1. A method for reporting channel state information (CSI) in a wireless communication system, the method performed by a user equipment (UE) comprising:
   receiving, from a base station, configuration information related to the channel state information,
   wherein the configuration information includes a number of a plurality of subbands allocated to the UE;
   measuring parameter values related to a channel state of one or more subbands of the plurality of subbands based on the configuration information; and
   reporting, to the base station, channel state information of the one or more subbands including the measured parameter values,
   wherein a number of the one or more subbands is determined based on a value of a rank indicator (RI),
   wherein the number of the one or more subbands is determined by dividing the number of the plurality of subbands by the RI value.

2. The method of claim 1, wherein reporting the channel state information of the one or more subbands is performed at a specific subband interval based on the number of the one or more subbands.

3. The method of claim 1, wherein each of the one or more subbands is comprised of a combination of two or more subbands of the plurality of subbands based on the RI value.

4. The method of claim 1, wherein the configuration information includes information for sizes of the plurality of subbands,
   wherein when the RI value is equal to or greater than a specific criterion, the sizes of the plurality of subbands are determined by a pre-configured value regardless of the configuration information.

5. The method of claim 1, wherein the configuration information includes a plurality of candidate values for sizes of the plurality of subbands,
   wherein when the RI value is equal to or greater than a specific criterion, the sizes of the plurality of subbands are determined by a largest value of the plurality of candidate values.

6. The method of claim 1, wherein other subbands, except the one or more subbands for measuring the parameter values related to the channel state, among the plurality of subbands are dropped.

7. A user equipment (UE) reporting channel state information (CSI) in a wireless communication system, the UE comprising:
- a transceiver configured to transmit and receive a radio signal;
- a processor functionally connected to the transceiver, and
- a memory operably connected to the processor and storing instructions that, when executed by the processor, configure the processor to perform operations comprising:
- receiving, from a base station, configuration information related to the channel state information,
- wherein the configuration information includes a number of a plurality of subbands allocated to the UE;
- measuring parameter values related to a channel state of one or more subbands of the plurality of subbands based on the configuration information; and
- reporting, to the base station, channel state information of the one or more subbands including the measured parameter values,
- wherein a number of the one or more subbands is determined based on a value of a rank indicator (RI),
- wherein the number of the one or more subbands is determined by dividing the number of the plurality of subbands by the RI value.

8. The UE of claim 7, wherein the reporting of the channel state information of the one or more subbands is performed at a specific subband interval based on the number of the one or more subbands.

9. The UE of claim 7, wherein each of the one or more subbands is comprised of a combination of two or more subbands of the plurality of subbands based on the RI value.

10. The UE of claim 7, wherein the configuration information includes information for sizes of the plurality of subbands,
wherein when the RI value is equal to or greater than a specific criterion, the sizes of the plurality of subbands are determined by a pre-configured value regardless of the configuration information.

11. The UE of claim 7, wherein the configuration information includes a plurality of candidate values for sizes of the plurality of subbands,
wherein when the RI value is equal to or greater than a specific criterion, the sizes of the plurality of subbands are determined by a largest value of the plurality of candidate values.

12. The UE of claim 7, wherein other subbands, except the one or more subbands for measuring the parameter values related to the channel state, among the plurality of subbands are dropped.

13. A method for receiving channel state information (CSI) in a wireless communication system, the method performed by a base station comprising:
- transmitting, to a user equipment (UE), configuration information related to the channel state information,
- wherein the configuration information includes a number of a plurality of subbands allocated to the UE; and
- receiving, from the UE, channel state information of one or more subbands of the plurality of subbands including parameter values related to a channel state of the one or more subbands of the plurality of subbands measured based on the configuration information,
- wherein a number of the one or more subbands is determined based on a value of a rank indicator (RI),
- wherein the number of the one or more subbands is determined by dividing the number of the plurality of subbands by the RI value.

* * * * *